(12) United States Patent
Hall et al.

(10) Patent No.: US 10,449,928 B2
(45) Date of Patent: Oct. 22, 2019

(54) PARKING BRAKE AND ANTI-THEFT APPARATUS FOR CROSS-DRILLED BRAKE SYSTEMS

(71) Applicants: David R. Hall, Provo, UT (US); Stephen R. Hall, Draper, UT (US); Jason Simpson, Provo, UT (US); Joe Fox, Spanish Fork, UT (US); Jedediah Knight, Provo, UT (US)

(72) Inventors: David R. Hall, Provo, UT (US); Stephen R. Hall, Draper, UT (US); Jason Simpson, Provo, UT (US); Joe Fox, Spanish Fork, UT (US); Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/681,988

(22) Filed: Aug. 21, 2017

(65) Prior Publication Data
US 2019/0054895 A1    Feb. 21, 2019

(51) Int. Cl.
| | | |
|---|---|---|
| *F16D 65/02* | (2006.01) | |
| *B60R 25/08* | (2006.01) | |
| *B60R 25/09* | (2013.01) | |
| *F16D 63/00* | (2006.01) | |
| *B60R 25/06* | (2006.01) | |
| *F16D 49/00* | (2006.01) | |
| *F16D 65/00* | (2006.01) | |
| *F16D 127/06* | (2012.01) | |

(52) U.S. Cl.
CPC .............. *B60R 25/08* (2013.01); *B60R 25/09* (2013.01); *F16D 63/006* (2013.01); *B60R 25/06* (2013.01); *F16D 49/00* (2013.01); *F16D 65/0087* (2013.01); *F16D 2065/1304* (2013.01); *F16D 2065/1328* (2013.01); *F16D 2127/06* (2013.01)

(58) Field of Classification Search
CPC ...... B60R 25/08; B60R 25/09; F16D 2127/06
USPC ........................................................ 188/265
See application file for complete search history.

(56) References Cited

U.S. PATENT DOCUMENTS

| | | | | |
|---|---|---|---|---|
| 3,479,072 A | * | 11/1969 | Kosar ................. | F16B 13/0858 403/276 |
| 3,495,688 A | * | 2/1970 | Isaacks ................. | B62B 5/0423 188/110 |
| 4,622,833 A | * | 11/1986 | Shepherd ................ | B60R 25/09 70/226 |
| 4,667,783 A | * | 5/1987 | Sugano ................... | B60T 1/005 188/31 |

(Continued)

*Primary Examiner* — Bradley T King
*Assistant Examiner* — Mahbubur Rashid

(57) ABSTRACT

A parking brake and anti-theft apparatus as described herein may include a brake assembly, a linear actuator and a plurality of locking pins. The brake assembly may include a rotor plate. The rotor plate may include a plurality of openings in and/or through the rotor plate. The plurality of locking pins may be extendable by the linear actuator. The pins may be aligned perpendicular to a face of the rotor plate such that, as at least one of the pins is disposed over one of the plurality of openings and the actuator extends the plurality of locking pins, the pin disposed over the one of the plurality of openings passes into the one of the plurality of openings. In various embodiments, the plurality of pins may comprise a length equal to or greater than a length between two adjacent openings of the plurality of openings.

19 Claims, 12 Drawing Sheets

(56) References Cited

U.S. PATENT DOCUMENTS

| | | | | |
|---|---|---|---|---|
| 5,065,848 A * | 11/1991 | Barrett | B60R 25/08 | 188/31 |
| 5,133,201 A * | 7/1992 | LaMott | B60R 25/09 | 188/265 |
| 5,465,986 A * | 11/1995 | MacRae | B62B 5/04 | 188/19 |
| 5,549,183 A * | 8/1996 | Buchanan, Jr. | F16D 65/14 | 188/265 |
| 5,806,862 A * | 9/1998 | Merryman | B62B 5/0423 | 188/111 |
| 5,855,381 A * | 1/1999 | Kirk | A63C 17/002 | 280/11.207 |
| 6,615,624 B2 * | 9/2003 | Cardwell | B60R 25/005 | 180/287 |
| 7,278,520 B2 * | 10/2007 | Kim | B60P 3/075 | 188/265 |
| 7,467,530 B2 * | 12/2008 | Torrado | B62H 5/141 | 188/265 |
| 7,707,861 B2 * | 5/2010 | Xavier | B62H 5/141 | 188/265 |
| 8,025,610 B2 * | 9/2011 | Chang | A63B 22/001 | 482/52 |
| 8,807,294 B2 * | 8/2014 | Hsieh | F16D 59/02 | 109/33 |
| 9,644,694 B2 * | 5/2017 | Smeeton | B60R 25/09 | |
| 2002/0108411 A1 * | 8/2002 | Cardwell | B60R 25/005 | 70/226 |
| 2003/0188938 A1 * | 10/2003 | Li | B60R 25/09 | 188/265 |
| 2004/0187620 A1 * | 9/2004 | Newman | F16D 63/006 | 74/411.5 |
| 2008/0309120 A1 * | 12/2008 | Kohlstrand | E05D 11/1007 | 296/146.11 |
| 2013/0076042 A1 * | 3/2013 | Amano | F03D 80/88 | 290/55 |
| 2015/0136535 A1 * | 5/2015 | Smeeton | B60R 25/09 | 188/69 |

* cited by examiner

PARKING BRAKE AND ANTI-THEFT APPARATUS FOR CROSS-DRILLED BRAKE SYSTEMS

TECHNICAL FIELD

This invention relates generally to the automotive field, and more specifically to parking brakes and anti-theft devices.

BACKGROUND

Vehicles have many safety and anti-theft features. For example, many vehicles include parking brakes and electronic vehicle immobilizers. Such parking brakes typically include frictional braking assemblies and transmission locks that prevent motion of the vehicle by engaging the drive mechanism with the transmission and preventing rotation of gears in the transmission. Such immobilizers typically prevent operation of the vehicle electronic control unit without the presence of a recognized key. Other devices and apparatuses that move by rolling on wheels also include mechanical locking mechanisms that directly prevent the wheels from rolling by introducing an object that directly interferes with the rotation of the wheels, such as by introducing a fixed object in the path of rotation of a wheel-connected component.

SUMMARY OF THE INVENTION

Various improvements and adaptations are described herein regarding the systems described in the Background. For example, embodiments of a parking brake and anti-theft apparatus for an automobile are described herein, particularly regarding brake assemblies incorporating one or more cross-drilled rotors. Embodiments may include a brake assembly, a linear actuator and a plurality of locking pins. The brake assembly may include a rotor plate. The rotor plate may include a plurality of openings in and/or through the rotor plate. The plurality of locking pins may be extendable by the linear actuator. The pins may be aligned perpendicular to a face of the rotor plate such that, as at least one of the pins is disposed over one of the plurality of openings and the actuator extends the plurality of locking pins, the pin disposed over the one of the plurality of openings passes into the one of the plurality of openings. In various embodiments, the plurality of pins may comprise a length extending from a first of the pins to a last of the pins. The length may be equal to or greater than a length between two adjacent openings of the plurality of openings.

In various embodiments, the openings may be disposed in a circular pattern. The circular pattern may be concentric with the rotor plate circumference. The plurality of pins may be aligned along the circular pattern, such that ends of the plurality of the pins form an arc. The openings may be aligned along a radius of the rotor plate. The plurality of pins may be aligned along the radius. The openings may be aligned along a chord of the rotor plate. The chord may be curved. The plurality of pins may be aligned along the chord.

In various embodiments, one or more of the plurality of pins may include a freely-rolling ball tip. The ball tip may include a spherical removable insert. The ball tip may be comprised of a material having a hardness exceeding a hardness of the rotor plate. For example, the spherical removable insert may have a hardness exceeding a hardness of the rotor plate. The ball tip may be comprised of one or more of tungsten carbide, titanium dioxide, diamond and silicon dioxide. For example, the spherical removable insert may be comprised on one or more of such materials.

In various embodiments, one or more of the openings and the pins may be comprised of one or more of tungsten carbide, titanium dioxide, diamond and silicon dioxide. In various embodiments, one or more of the openings may comprise an insert. The insert may be hollow. The insert may be comprised of a material different than a material of the rotor plate. The insert may be removable from the corresponding opening. The insert material may have a hardness greater than the rotor plate material. The insert material may be comprised of one or more of tungsten carbide, titanium dioxide, diamond and silicon dioxide. In various embodiments, one or more of the plurality of pins may comprise a core and a lining. The lining may have a hardness greater than a material of the rotor plate. The lining may be comprised of one or more of tungsten carbide, titanium dioxide, diamond and silicon dioxide.

BRIEF DESCRIPTION OF THE DRAWINGS

A more particular description of the apparatus summarized above is made below generally and by reference to specific embodiments. Several embodiments are depicted in drawings included with this application, in which.

DETAILED DESCRIPTION

A detailed description of embodiments of an apparatus is provided below by example, with reference to embodiments in the appended figures. Those of skill in the art will recognize that the features of the apparatus as described by example in the figures below could be arranged and designed in a variety of different configurations without departing from the scope of the claims. Thus, the detailed description below and the depictions of embodiments in the figures is representative of the apparatus described in the claims, and is not intended to limit the scope of the claims.

Figure 1:
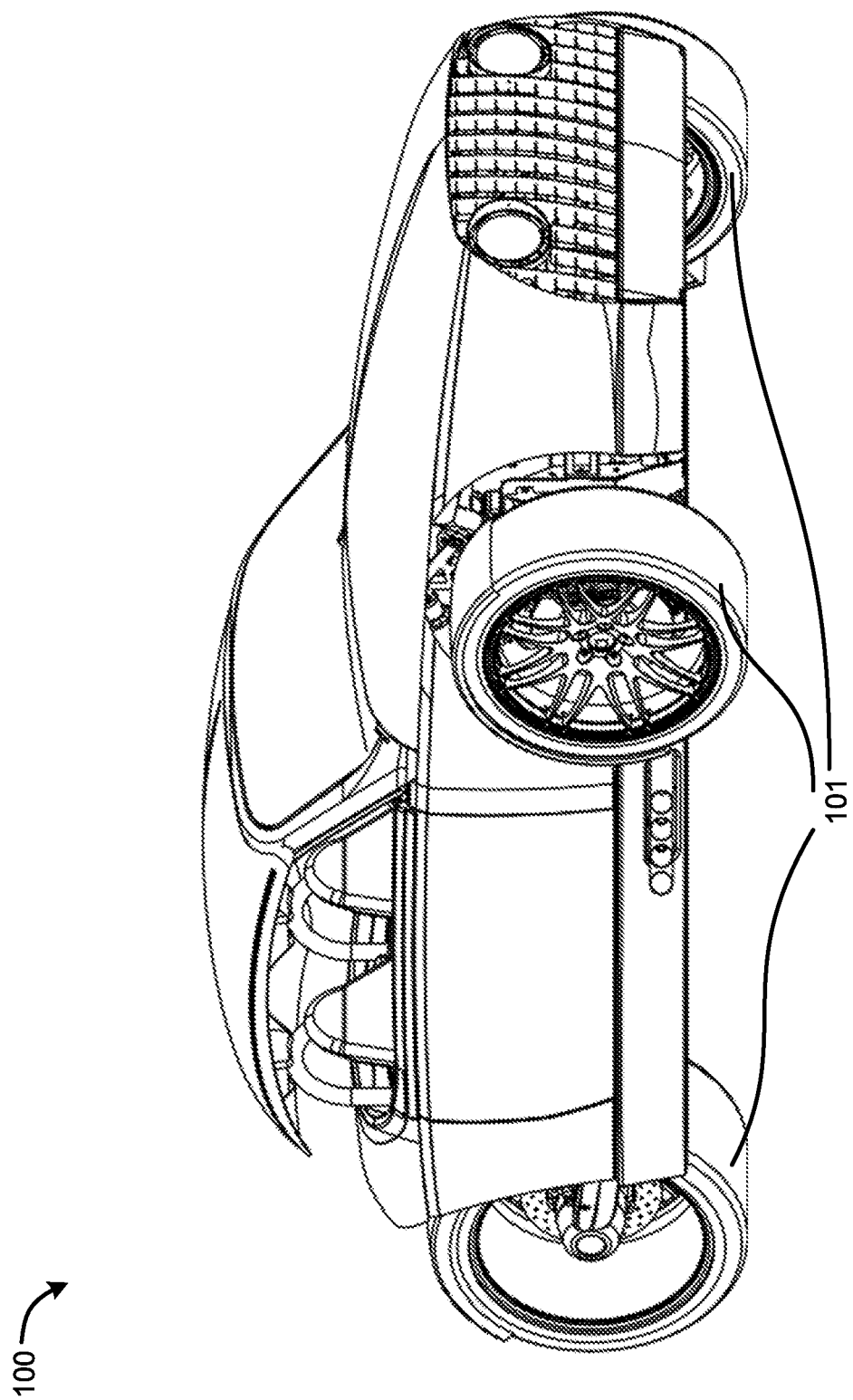
FIG. 1 depicts an isometric view of a vehicle on which the parking brake and anti-theft apparatus may be used.

FIG. 1 depicts an isometric view of a vehicle on which the parking brake and anti-theft apparatus may be used. The vehicle 100 includes three wheels 101. The parking brake and anti-theft apparatus as described herein may correspond to one or more of the wheels 101. Though depicted as a three-wheeled vehicle, the vehicle 100 may be any of a variety of wheeled vehicles, including two-wheeled vehicles, four-wheeled vehicles, and, in some embodiments, any of a variety of tracked vehicles.

Figure 2:
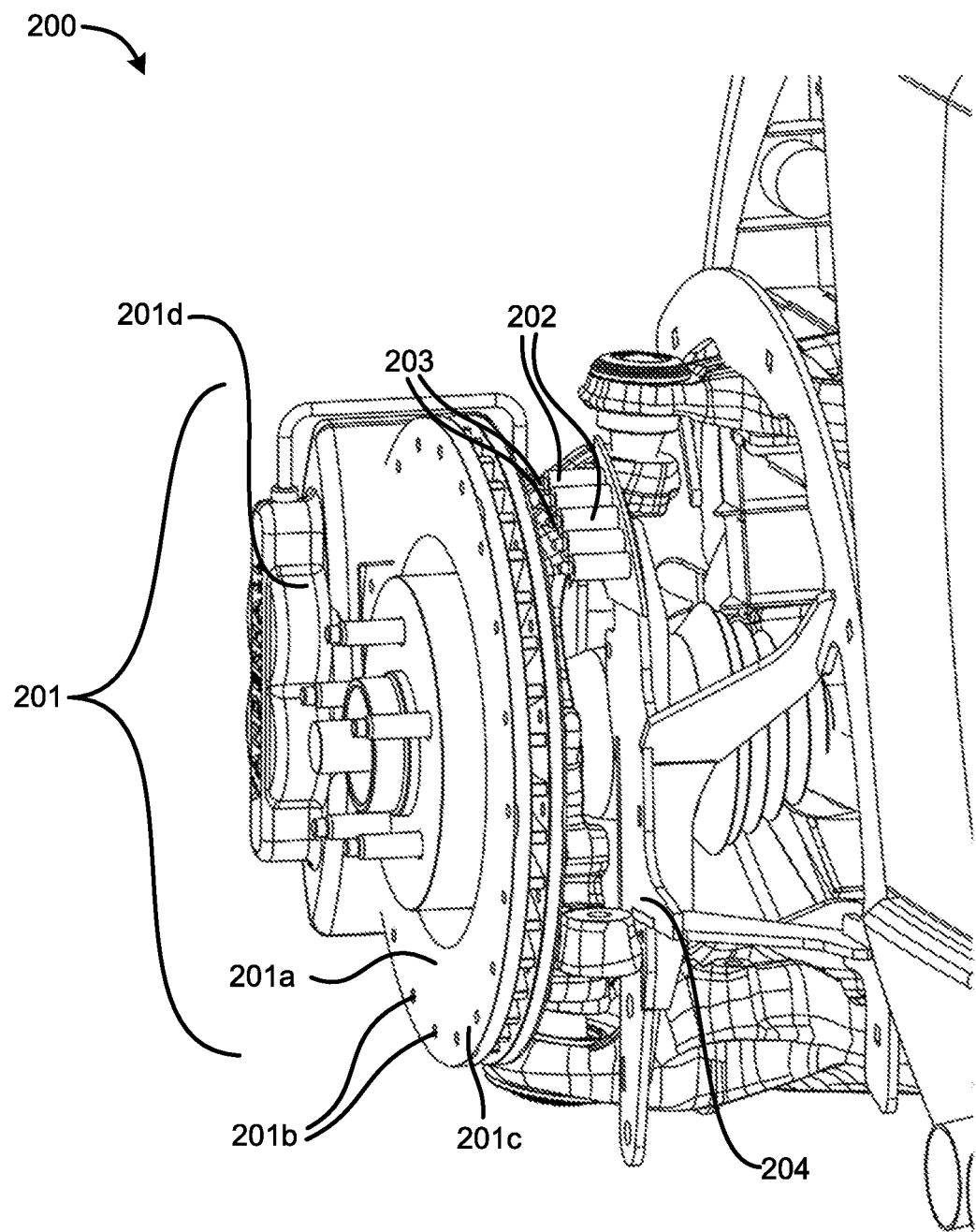
FIG. 2 depicts one embodiment of a parking brake and anti-theft apparatus as described herein.

FIG. 2 depicts one embodiment of a parking brake and anti-theft apparatus as described herein. The apparatus 200 includes a brake assembly 201, linear actuators 202, locking pins 203, and a brake assembly frame 204. The brake assembly 201 includes a rotor plate 201a with a plurality of openings 201b through the rotor plate 201a forming a circular pattern 201c of the rotor plate 201a, and a caliper 201d.

In some embodiments, such as that depicted, the apparatus 200 may increase the overall unsprung weight of the vehicle. However, in some embodiments, the apparatus 200 may be mounted to a swing arm, such as aligned with the pivot axis of the swing arm, or closer to the pivot axis than the wheel hub. The apparatus may extend from the swing arm to the rotor. Such placement may only add to the sprung weight of the vehicle, or may minimally add to the unsprung weight of the vehicle. For example, the apparatus 200 may be mounted to the spring arm of the rear wheel 101 of the vehicle 100 as depicted in FIG. 1.

The brake assembly 201 may be used to slow a vehicle as the vehicle is traveling. The caliper 201d may compress around the rotor plate 201a, creating contact between pads connected to the caliper 201d and rotor plate 201a. The brake rotor 201a may be circular, having a circumference defined by an outer edge of the brake rotor. The circular pattern 201c is concentric with the rotor plate 201a circumference. The rotor plate 201a may be composed of cast iron, steel, stainless steel, carbon, various metallic ceramics, or combinations thereof. The rotor plate may be vented, cross-drilled, and/or slotted. The pads connected to the caliper 201d may be comprised of synthetic materials such as cellulose, aramid, polyacrylonitrile, and/or sintered glass; flaked metals such as copper, iron, and/or steel; graphite; clay; porcelain; phenol formaldehyde resin; cement; and/or combinations thereof and equivalents.

The linear actuators 202 may be mounted to the brake assembly frame 204, which may in turn be mounted to a knuckle to which the rotor plate 201a rotatably mounts. As depicted, the linear actuators 202 are solenoids. However, in various embodiments, the linear actuators 202 may include any of a variety of linear actuators. Such actuators may include various components, including a spring, a hydraulic cylinder and pump, a pneumatic cylinder and pump, a motor, a screw, a cam, a wedge, or combinations thereof Although multiple solenoids are depicted, the solenoids may operate in conjunction with each other to operate as a single linear actuator 202 for the locking pins 203. Such may be accomplished by, for example, connecting each solenoid in parallel to a single switch such that opening the switch causes actuation of each of the solenoids. A similar arrangement may be made for a hydraulic or pneumatic system, where each cylinder associated with each locking pin 203 is fluidically coupled to the same pump. In one embodiment, each locking pin 203 rests against a spring, which in turn rests against a cam. As the cam is rotated, for example by a motor, the locking pins 203 extend. Such rotation with cause some of the locking pins 203 to contact the rotor plate 201a and compress the corresponding springs, whereas one or more other locking pins will extend into one or more corresponding openings 201b.

Coupled to, or incorporated with, the actuator 202 may be a position sensor, such as a potentiometer, a capacitive displacement sensor, a rotary encoder, or any of various equivalents. The position sensor may detect a position of one or more of the locking pins 203 relative to the linear actuators 202, the rotor plate 201a, or both.

The brake assembly frame 204 may be mounted to a knuckle, which in turn may be connected to upper and lower control arms rotatably mounted to a vehicle frame. Various components of the brake assembly 201, including the rotor plate 201a, may be mounted to the knuckle, and various components, including the caliper 201d, may be mounted to the brake assembly frame 204 and/or the knuckle. The brake assembly frame 204 may be formed of iron, steel, aluminum, carbon steel, combinations thereof, or equivalents.

The locking pins 203 are aligned perpendicular to the face of the rotor plate 201a. As at least one of the locking pins 203 is disposed over one of the plurality of openings 201b, and as the linear actuators 202 extend the locking pins 203, the locking pin 203 disposed over the one of the plurality of openings 201b passes into the one of the plurality of openings 201b.

In general, the apparatus described above may act as a parking brake and/or anti-theft apparatus. The linear actuators 202 may be electronically connected to a vehicle electronic control unit (ECU), such as via a CAN bus. The ECU may store instructions to actuate the linear actuators 202 when a signal is received from a parking brake control activated by a user. The ECU may store instructions to retract the locking pins 203 when receiving a second signal from a parking brake control deactivated by the user. The ECU may also store anti-theft instructions. The linear actuators 203 may have a default "locked" setting, wherein the locking pins 203 are extended into the locked configuration (i.e. at least one locking pin 203 is extended into at least one of the openings 201b). The ECU may listen for a passive or active RF key which indicates an authorized user of the vehicle is present in or near the vehicle. Upon receiving the key, the ECU may signal the linear actuators 202 to retract the locking pins 203. When the ECU no longer detects the key, the ECU may signal the linear actuators 202 to extend the locking pins 203.

Figure 3:
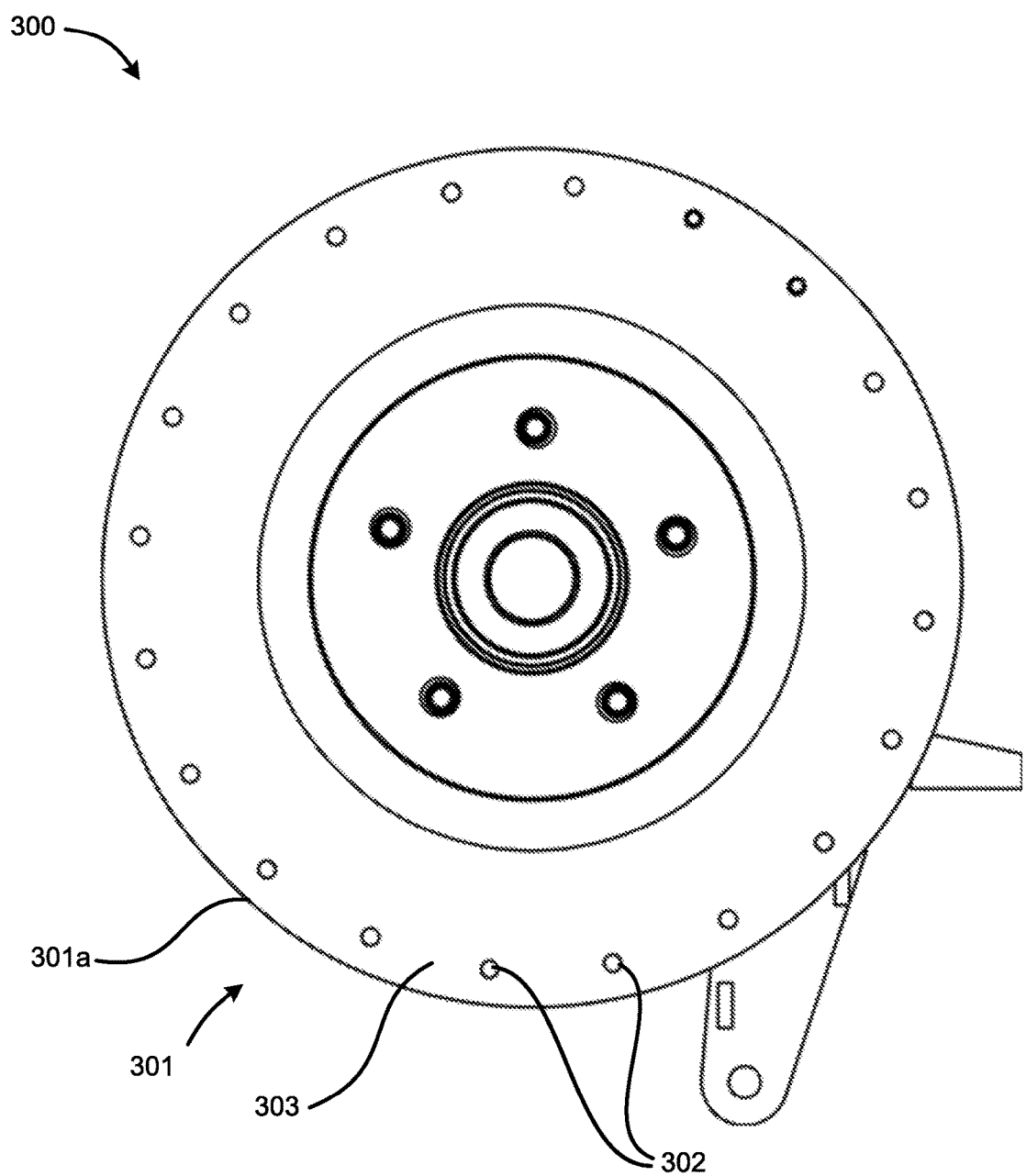
FIG. 3 depicts a side view of a parking brake and anti-theft apparatus embodiment as described herein.

FIG. 3 depicts a side view of a parking brake and anti-theft apparatus embodiment as described herein. The apparatus 300 includes a rotor plate 301 with a plurality of openings 302. The rotor plate 301 has a circumference 301a. The openings 302 form a circular pattern 303 that is concentric with the rotor plate circumference 301a. The openings 302 may be cross-drilled openings for cooling the rotor plate 301, or may be specifically included for use with the parking brake and anti-theft apparatus. The openings 302 may pass completely through the rotor plate. Alternatively, the openings 302 may only extend partially into the rotor plate 301.

Locking pins are disposed within two adjacent openings 302. The locking pins are similarly aligned along the circular pattern 303. The set of locking pins comprise a length extending from a first of the pins to a last of the pins (i.e. extending from one distal end of the locking pin set to the opposite distal end). The length is equal to a length between the two adjacent openings 302. In some embodiments, the locking pin end-to-end length may be greater than the inter-opening length.

The length proportions described above are particularly beneficial in ensuring that at least one locking pin will engage with at least one opening 302. When a vehicle is brought to rest from rolling motion, it is not guaranteed that the openings 302 will align with the locking pins, such that a locking pin will extend into one of the openings 302. If only one locking pin were included, or even several with the same inter-pin spacing as the openings 302, misalignment would require rolling the vehicle to ensure the pins extend into the openings 302. The momentum of the vehicle can cause damage to the pins, especially if the pins are at least half the inter-opening length from the nearest opening 302. However, if the pins are positioned adjacent to each other such that, end-to-end, the length of the set of pins is equal to the inter-opening length, the chances of misalignment are greatly reduced. Additionally, if misalignment occurs, the likelihood of the vehicle gaining enough momentum to damage the pins is greatly reduced. In some anti-theft embodiments, the pins may be extended regardless of alignment, and as soon as the vehicle begins rolling without deactivating the apparatus, the pins lock the rotor 301.

Figure 4:
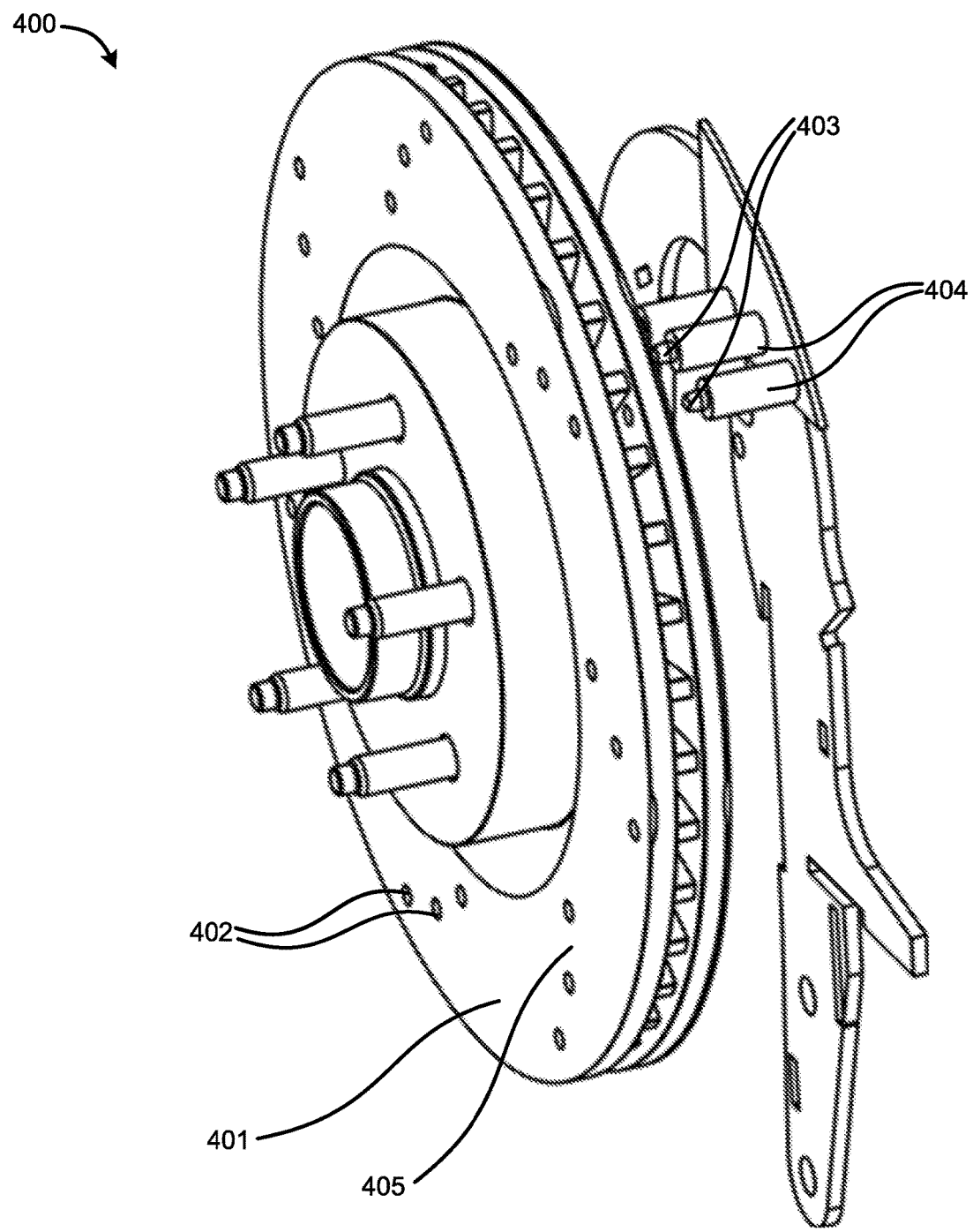
FIG. 4 depicts an alternative embodiment of a parking brake and anti-theft apparatus.

FIG. 4 depicts an alternative embodiment of a parking brake and anti-theft apparatus. The apparatus 400 includes a rotor plate 401 with a plurality of openings 402, and a set of locking pins 403 and corresponding linear actuators 404. The openings 402 are aligned along chords 405 of the circular rotor plate 401. The locking pins 403 are also aligned along a chord 405. As shown, the chords 405 are curved towards the curvature of the rotor plate 401. However, in some embodiments, the chords 405 are straight. In some embodiments, the chords 405 curved against the curvature of the rotor plate 401.

Figure 5:
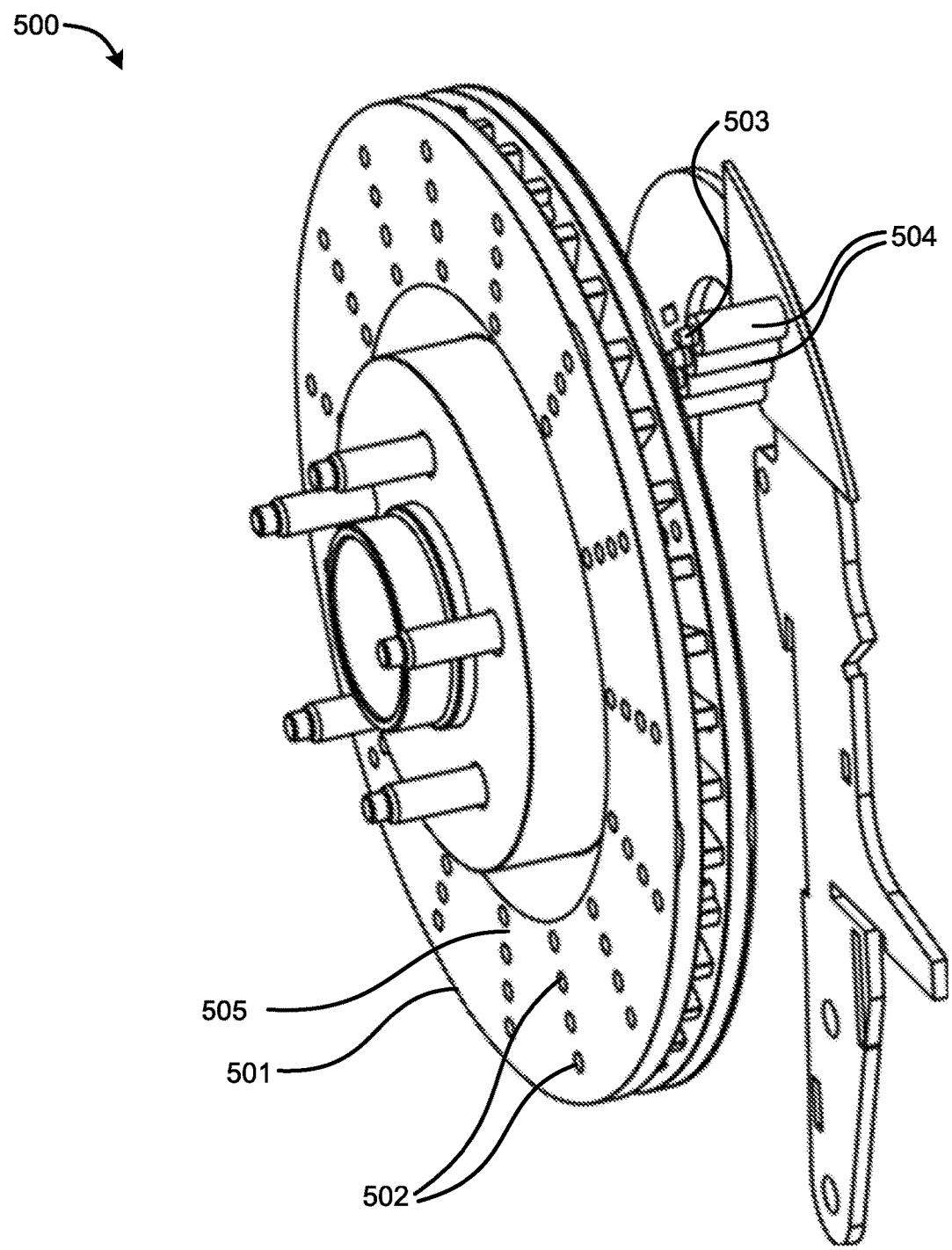
FIG. 5 depicts yet another alternative embodiment of a parking brake and anti-theft apparatus.

FIG. 5 depicts yet another alternative embodiment of a parking brake and anti-theft apparatus. The apparatus 500 includes a rotor plate 501 with a plurality of openings 502, and a set of locking pins 503 and corresponding linear actuators 504. The openings 502 and locking pins 503 are aligned along radii 505 of the rotor plate 501.

Figure 6:
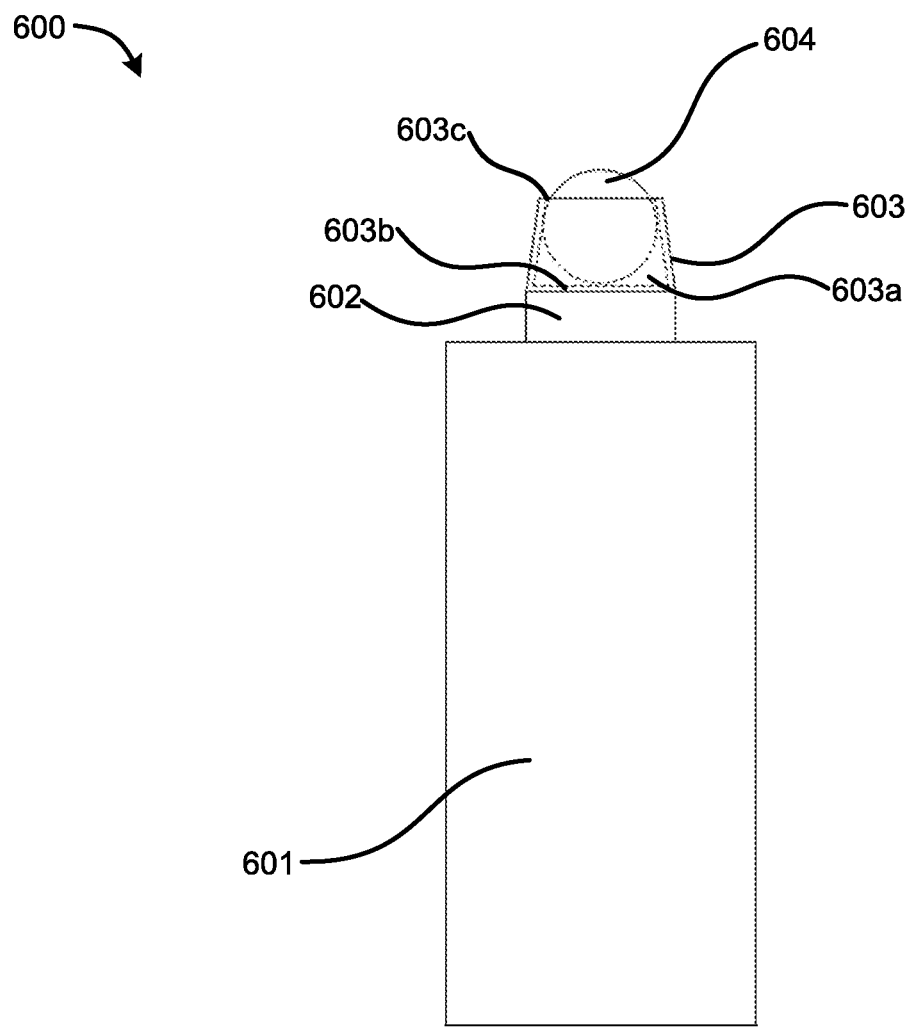
FIG. 6 depicts one embodiment of a linear actuator and locking pin.

FIG. 6 depicts one embodiment of a linear actuator and locking pin. The mechanism 600 includes a solenoid 601, a pin body 602, a pin head 603, and a ball 604. The pin head 603 comprises a chamber 603a within which the ball 604 sits, a closed end 603b, and an open end 603c. The open end 603c has a diameter narrower than the diameter of the ball 604. The ball is secured within the chamber 603a between the closed end 603b and the open end 603c. The chamber may contain a lubricant, such as a dry lubricant, which enables the ball 604 to roll freely within the pin head 603. Together, the pin head 603 and ball 604 form a freely-rolling ball tip of the pin body 602.

The pin body 602 may be comprised of a permanent magnet, ferromagnetic material such as iron, various types of steel, or equivalents, or combinations thereof. In some embodiments, the pin body may be at least partially comprised of tungsten carbide, titanium dioxide, diamond and silicon dioxide. The pin head 603 and ball 604 may be made of similar materials. One or more of the pin head 603 and the ball 604 may be comprised of a material having a hardness exceeding a hardness of the rotor plate. For example, the rotor plate may be comprised of a steel having a Mohr's hardness of 7, and the ball 604 may be comprised of a tungsten carbide alloy having a hardness of 8. In general, the ball 604 and/or pin head 603 may be comprised of one or more of tungsten carbide, titanium dioxide, diamond and silicon dioxide. In some embodiments, however, the ball 604 and/or pin head 603 may have a hardness that is less than, or at most equal to, the hardness of the rotor plate.

Figure 7A:
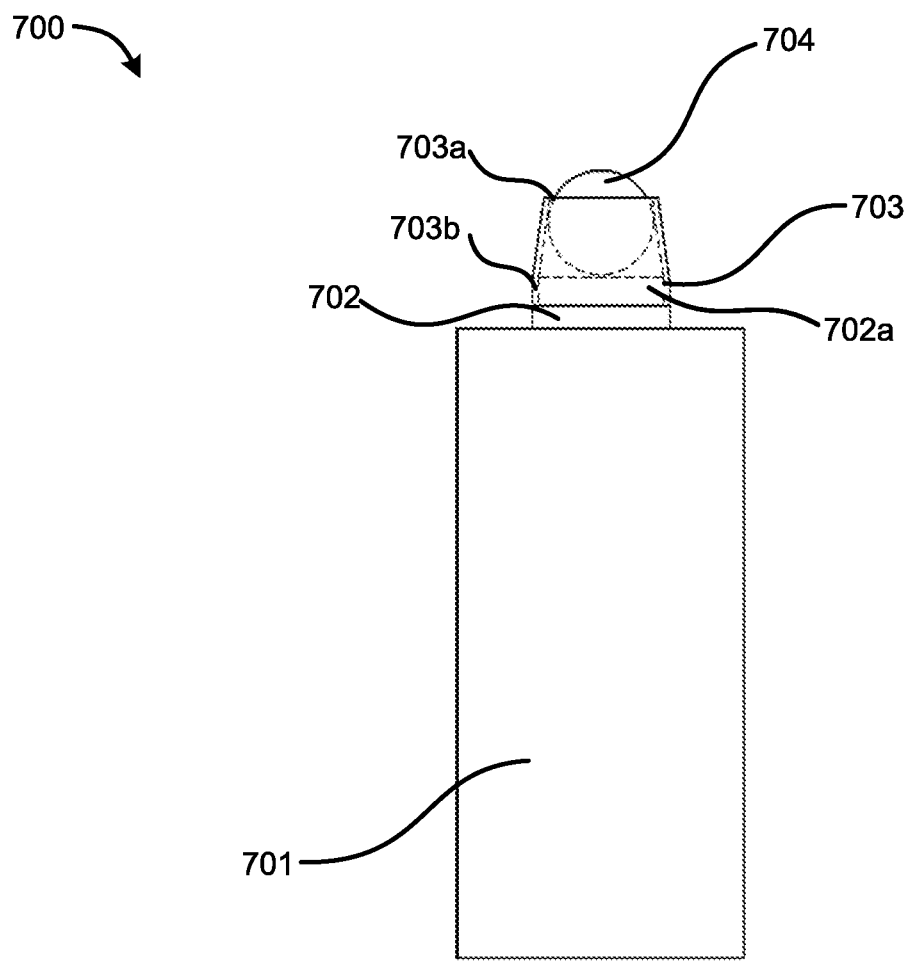
FIG. 7A depicts a first view of a linear actuator and locking pin with a removable ball.
Figure 7B:
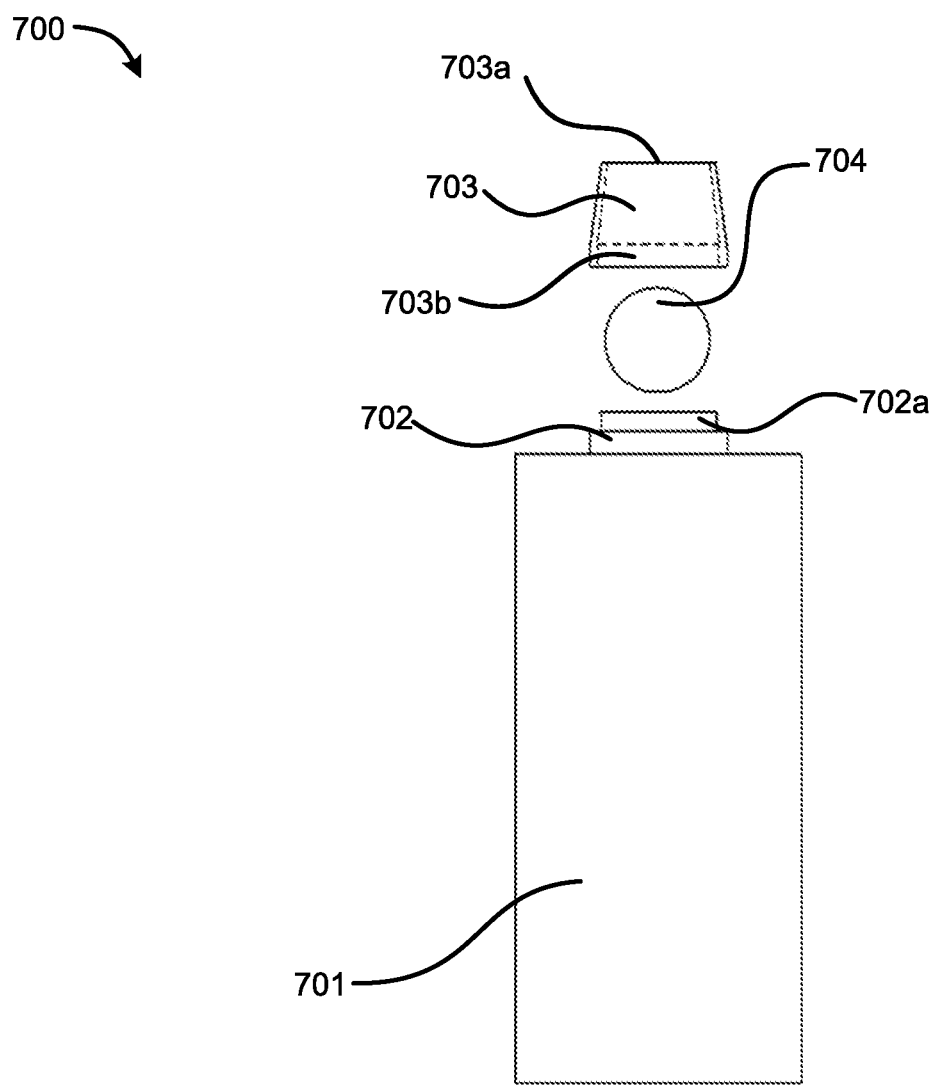
FIG. 7B depicts a second view of the linear actuator and locking pin with the removable ball depicted in FIG. 7A.

FIG. 7A depicts a first view of a linear actuator and locking pin with a removable ball. FIG. 7B depicts the mechanism disassembled to remove the ball. The mechanism 700 includes a linear actuator 701, a pin body 702, a removable pin head 703, and a removable spherical insert 704 (i.e. ball). The pin body 702 and pin head 703 each include complementary threaded portions. The pin head 703 is hollow, having an inner diameter at least equal to the diameter of the spherical insert 704. The pin head 703 also includes an opening 703a opposite the threaded end 703b that has a diameter narrower than the diameter of the spherical insert 704. In the assembled configuration, the spherical insert 704 is secured in place by the threaded end 702a of the pin body and the pin head opening 703a.

FIG. 7B depicts the mechanism 700 disassembled to remove the ball. As with FIG. 7A, the mechanism 700 as depicted in FIG. 7B includes the linear actuator 701, the pin body 702, the removable pin head 703, and the removable spherical insert 704 (i.e. ball). As shown, the pin head 703 may be unscrewed from the pin body 702 to remove the spherical insert 704. The spherical insert 704 may be removed and replaced, which may simplify maintenance of the mechanism 700.

Figure 8:
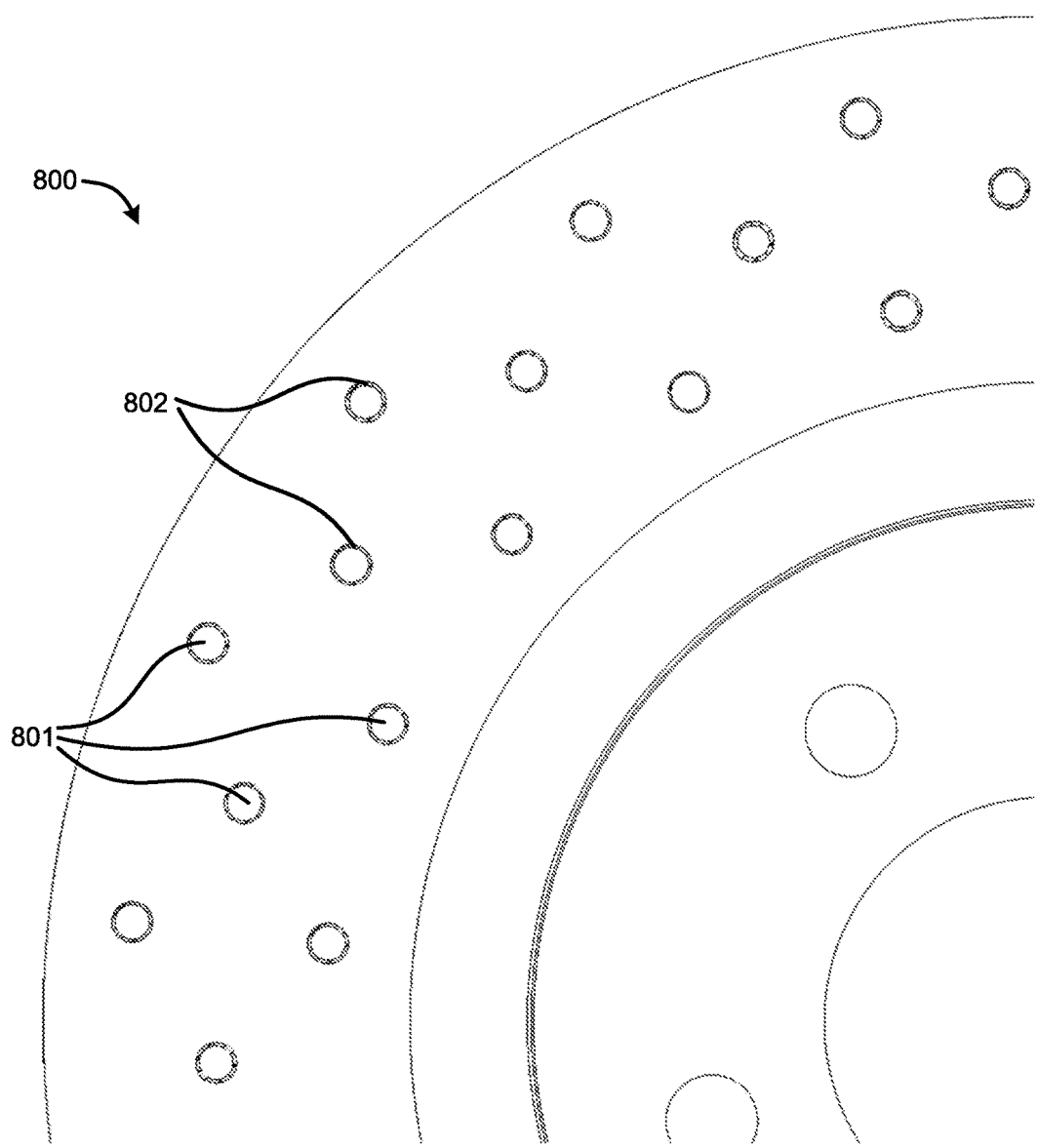
FIG. 8 depicts one embodiment of a rotor plate for use in the parking brake and anti-theft apparatus described herein.

FIG. 8 depicts one embodiment of a rotor plate for use in the parking brake and anti-theft apparatus described herein. The rotor plate 800 includes cross-drilled openings 801 with hollow inserts 802. The hollow inserts 802 are comprised of a different material than the material of the rotor plate 800, generally. The material comprising the hollow inserts 802 may have a hardness greater than the material comprising the rotor plate 800, generally. The inserts 802 may be comprised of one or more of tungsten carbide, titanium dioxide, diamond and silicon dioxide.

Figure 9:
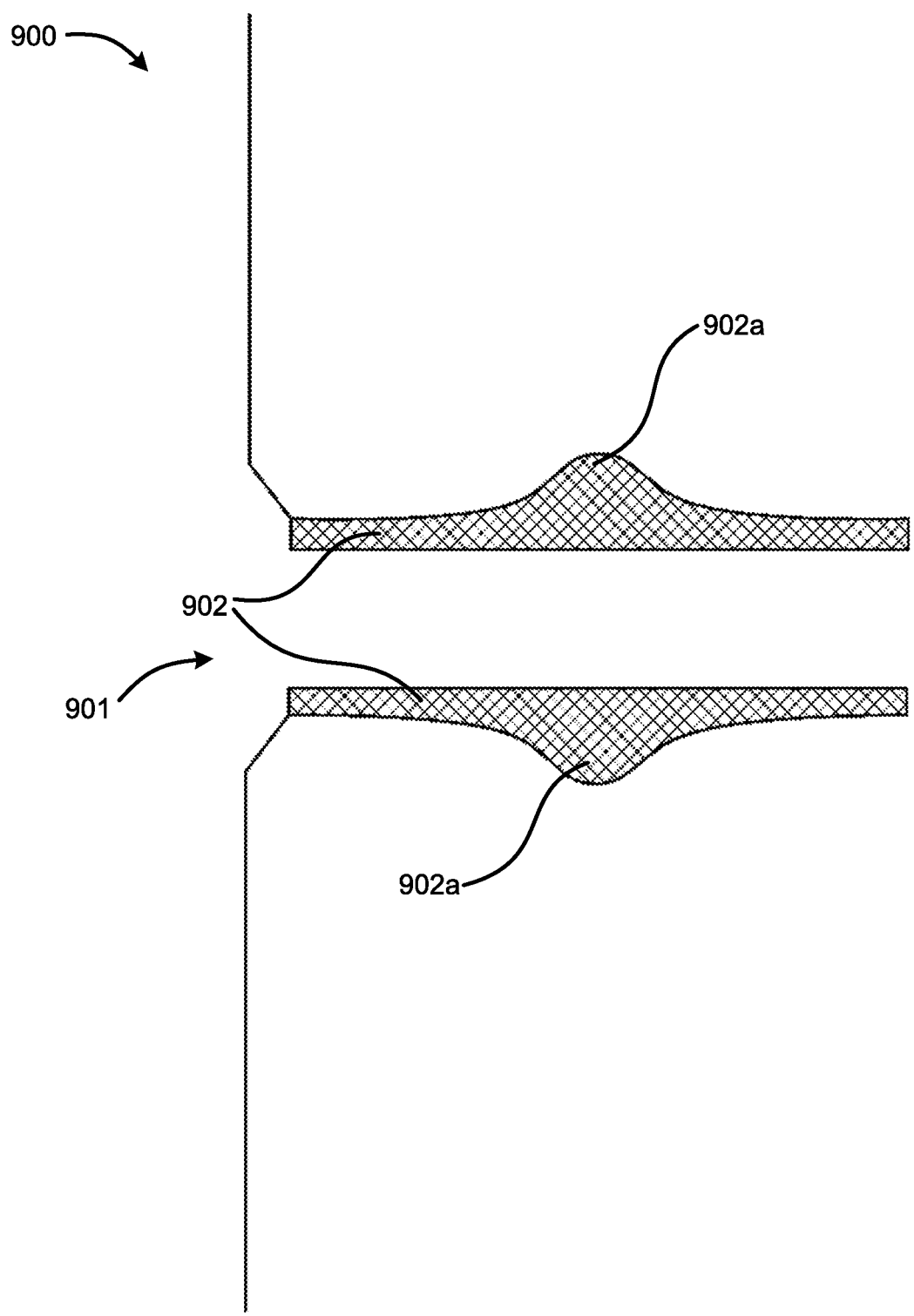
FIG. 9 depicts a cross-sectional view of a hollow insert.

FIG. 9 depicts a cross-sectional view of a hollow insert. The rotor plate 900 includes an opening 901 lined with a hollow insert 902. The hollow insert includes central bulging 902a, which retains the insert 902 within the opening 901, even as the insert 902 and rotor plate 900 are heated during kinetic braking. The insert 902 may be comprised of a material having a hardness greater than the material of the rotor plate 900, generally. The insert material may also have a lower coefficient of thermal expansion than the rotor plate material. The bulging 902a may have dimensions such that, as the insert and rotor plate materials are heated, the maximum diameter of the bulging 902a always remains greater than the minimum diameter of the opening 901. The difference between the maximum diameter of the bulging 902a and the minimum diameter of the opening 901 may range from 5% to 10%, from 10% to 15%, or from 15% to 30%.

Figure 10:
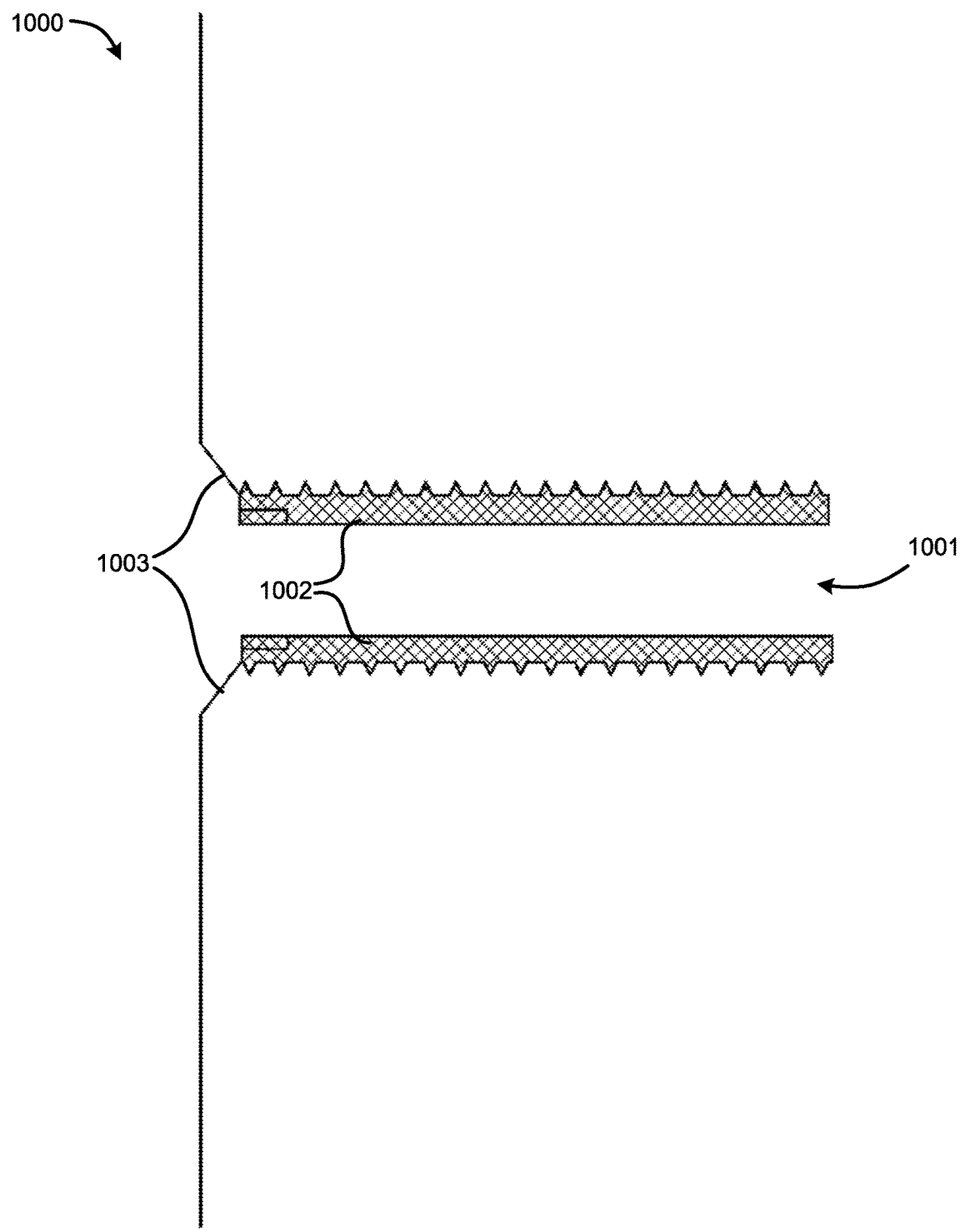
FIG. 10 depicts a cross-sectional view of a removable hollow insert.

FIG. 10 depicts a cross-sectional view of a removable hollow insert. The rotor plate 1000 includes an internally threaded opening 1001 and an externally threaded insert 1002. The rotor plate 1000 also includes a chamfer 1003 around the opening 1001. The chamfer 1003 protects the insert 1002 from contact with the brake pads during kinetic braking. This may prevent the brake pads from loosening the inserts 1002 from the rotor plate 1000, which may cause damage to the brake pad and/or insert.

Figure 11:
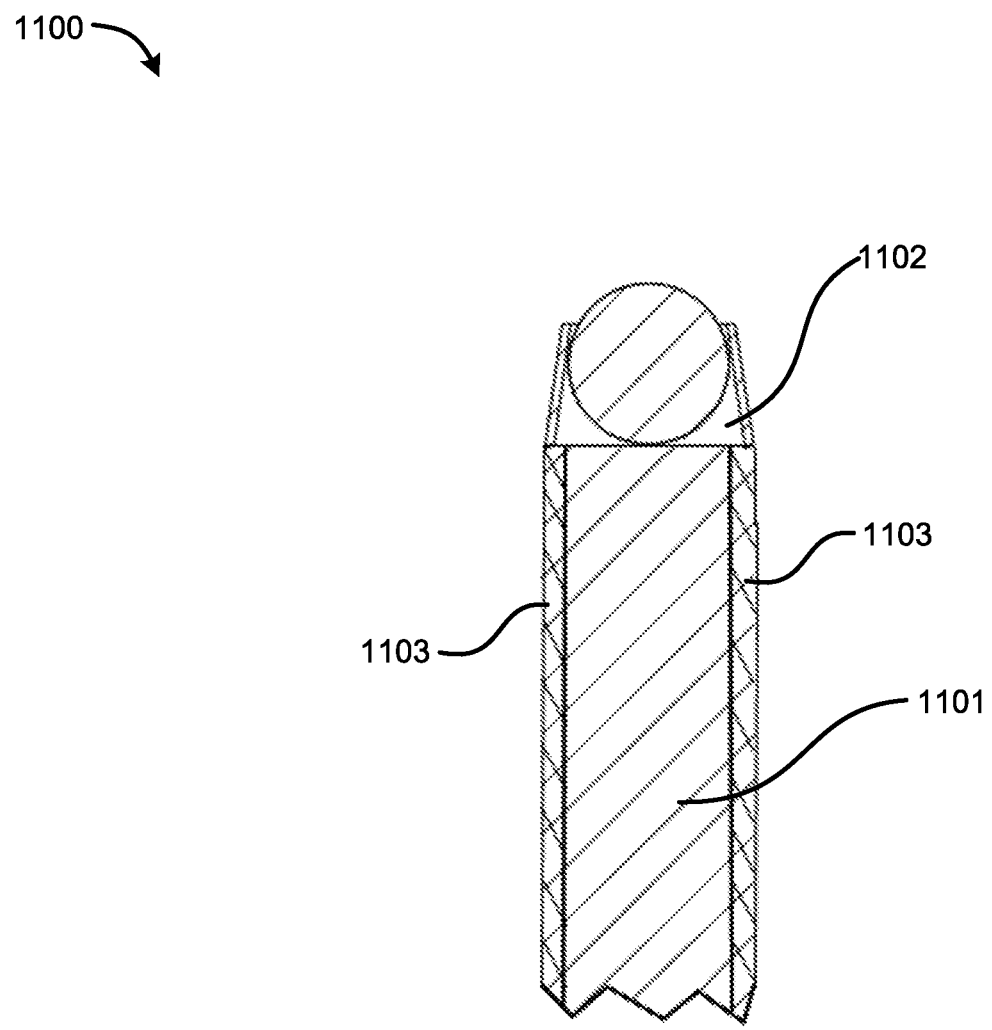
FIG. 11 depicts a cross-sectional view of a locking pin for use with a parking brake and anti-theft apparatus.

FIG. 11 depicts a cross-sectional view of a locking pin for use with a parking brake and anti-theft apparatus. The pin 1100 includes a core 1101, a head 1102, and a lining 1103. The lining 1103 has a hardness greater than a material of a corresponding rotor plate. The lining 1103 may be comprised of one or more of tungsten carbide, titanium dioxide, diamond and silicon dioxide.

We claim:

1. A vehicle parking brake and anti-theft apparatus, comprising:
   a brake assembly comprising a rotor plate, the rotor plate comprising a plurality of openings through the rotor plate; and
   a plurality of locking pins, each locking pin having a corresponding linear actuator, wherein each locking pin is extendable from the corresponding linear actuator, the pins aligned perpendicular to a circular face of the rotor plate such that, as at least one of the pins is disposed over one of the plurality of openings and the linear actuator extends locking pin disposed over the one of the plurality of openings, the pin disposed over the one of the plurality of openings extends from the linear actuator and passes into the one of the plurality of openings, wherein the plurality of pins comprise a length extending from a first of the pins to a last of the pins, the length equal to or greater than a length between two adjacent openings.

2. The vehicle parking brake and anti-theft apparatus of claim 1, wherein the openings are disposed in a circular pattern concentric with the rotor plate circumference.

3. The vehicle parking brake and anti-theft apparatus of claim 2, wherein the plurality of pins are aligned along the circular pattern.

4. The vehicle parking brake and anti-theft apparatus of claim 1, wherein the openings are aligned along a radius of the rotor plate.

5. The vehicle parking brake and anti-theft apparatus of claim 4, wherein the plurality of pins are aligned along the radius.

6. The vehicle parking brake and anti-theft apparatus of claim 1, wherein the openings are aligned along a chord of the rotor plate.

7. The vehicle parking brake and anti-theft apparatus of claim 6, wherein the chord is curved.

8. The vehicle parking brake and anti-theft apparatus of claim 6, wherein the plurality of pins are aligned along the chord.

9. The vehicle parking brake and anti-theft apparatus of claim 1, wherein one or more of the plurality of pins comprises a core and a lining, the lining having a hardness greater than a hardness of a material of the rotor plate.

10. The vehicle parking brake and anti-theft apparatus of claim 9, wherein the lining comprises one or more of tungsten carbide, titanium dioxide, diamond and silicon dioxide.

11. The vehicle parking brake and anti-theft apparatus of claim 1, wherein one or more of the pins comprises one or more of tungsten carbide, titanium dioxide, diamond and silicon dioxide.

12. A vehicle parking brake and anti-theft apparatus, comprising:
   a brake assembly comprising a rotor plate, the rotor plate comprising a plurality of openings through the rotor plate; and
   a plurality of locking pins, each locking pin having a corresponding linear actuator, wherein each locking pin is extendable from the corresponding linear actuator, the pins aligned perpendicular to a face of the rotor plate such that, as at least one of the pins is disposed over one of the plurality of openings and the actuator extends the plurality of locking pins, the pin disposed over the one of the plurality of openings passes into the one of the plurality of openings, wherein one or more of the plurality of pins comprises a freely-rolling ball tip.

13. The vehicle parking brake and anti-theft apparatus of claim 12, wherein the ball tip comprises a spherical removable insert.

14. The vehicle parking brake and anti-theft apparatus of claim 12, wherein the ball tip comprises a material having a hardness exceeding a hardness of the rotor plate.

15. The vehicle parking brake and anti-theft apparatus of claim 12, wherein the ball tip comprises one or more of tungsten carbide, titanium dioxide, diamond, and silicon dioxide.

16. A vehicle parking brake and anti-theft apparatus, comprising:
   a brake assembly comprising a rotor plate, the rotor plate comprising a plurality of openings through the rotor plate; and
   a plurality of locking pins, each locking pin having a corresponding linear actuator, wherein each locking pin is extendable from the corresponding linear actuator, the pins aligned perpendicular to a face of the rotor plate such that, as at least one of the pins is disposed over one of the plurality of openings and the actuator extends the plurality of locking pins, the pin disposed over the one of the plurality of openings passes into the one of the plurality of openings, wherein one or more of the openings comprises a hollow insert, the insert comprising a material different than a material of the rotor plate.

17. The vehicle parking brake and anti-theft apparatus of claim 16, wherein the insert is removable.

18. The vehicle parking brake and anti-theft apparatus of claim 16, wherein the insert material has a hardness greater than the rotor plate material.

19. The vehicle parking brake and anti-theft apparatus of claim 16, wherein the insert material comprises one or more of tungsten carbide, titanium dioxide, diamond, and silicon dioxide.

* * * * *